Jan. 2, 1968     E. C. WEISKOPF     3,361,019
TISSUE HOLDER AND KNIFE GUIDE

Filed April 7, 1966     2 Sheets-Sheet 1

INVENTOR.
EDWIN C. WEISKOPF
BY
ATTORNEY

Jan. 2, 1968     E. C. WEISKOPF     3,361,019
TISSUE HOLDER AND KNIFE GUIDE
Filed April 7, 1966     2 Sheets-Sheet 2
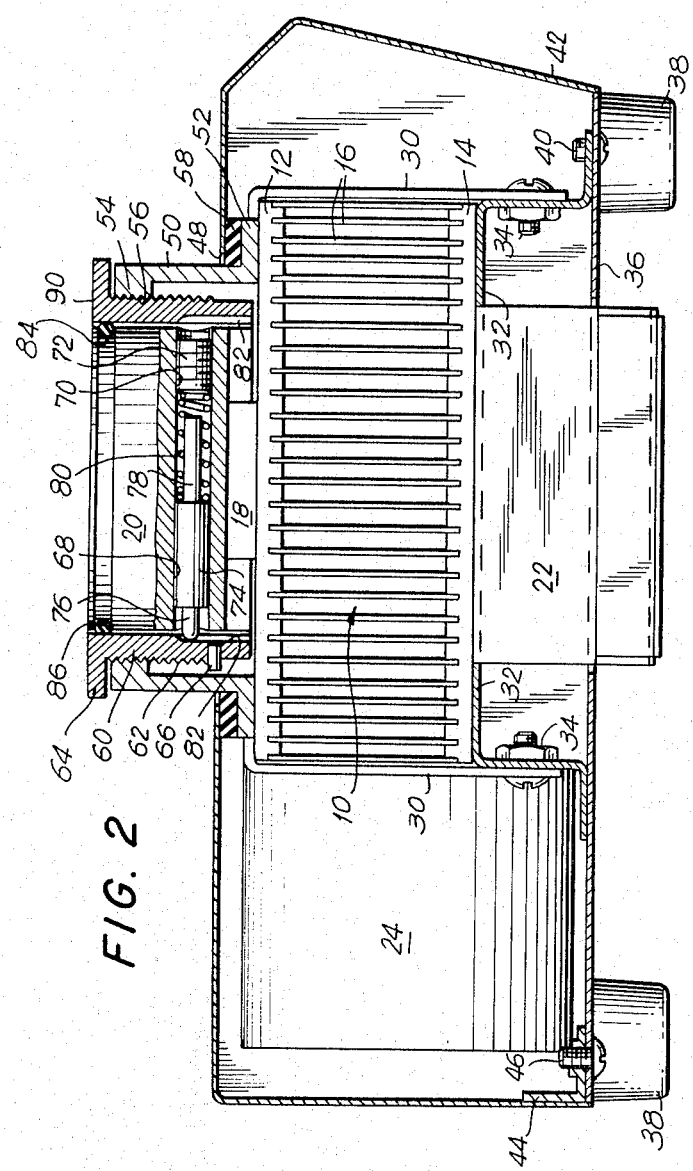
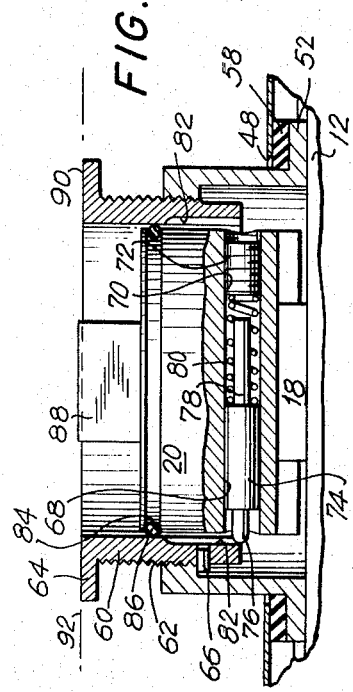
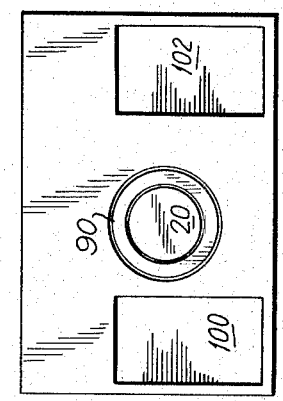
INVENTOR.
EDWIN C. WEISKOPF
BY
ATTORNEY

United States Patent Office 3,361,019
Patented Jan. 2, 1968

3,361,019
TISSUE HOLDER AND KNIFE GUIDE
Edwin C. Weiskopf, New York, N.Y., assignor to Technicon Corporation, a corporation of New York
Filed Apr. 7, 1966, Ser. No. 540,963
7 Claims. (Cl. 83—15)

This invention relates to a method of preparing histological specimens and an apparatus therefor, and more particularly, to the preparation of uniformly thinly cut gross tissue specimens from a block of tissue in its natural state.

There are two customary methods of providing sections of tissue specimens for microscopic examination. In the first method, the block of tissue, as provided by the surgeon, is manually held on a surface and cut with a knife into gross tissue specimens. These gross tissue specimens are immersed sequentially in a plurality of solutions to fix the tissue. The fixation of the tissue preserves the cells and intracellular substances, and precludes the putrefaction action of bacteria therein. After fixation, the gross tissue is made rigid for cutting into sections by dehydrating, clearing and then embedding the tissue in paraffin or celloidin, or by freezing the tissue by carbon-dioxide gas. These techniques are discussed in "Histopathological Technic," by Krejian and Grodwohl, the C. U. Mosby Company, St. Louis, 1952. In the second method, which is generally used for a quick, while the surgery is proceeding, preliminary appraisal, the block of tissue is frozen, and sections for microscopic examination are taken therefrom. It is thought that freezing tends to distort the intracellular structure and to reduce the detail available to the observer.

I have discovered that by cutting the block into gross specimens of uniformly thin thickness, for example, a tenth of inch thick, as compared to irregular, thicker thicknesses, the fixation and embedding of a plurality of specimens proceeds much more rapidly and uniformly. This is especially desirable when automatic fixing and embedding apparatus is subsequently used, such as was early shown in my U.S. Patent No. 2,157,875, issued May 9, 1939.

Not frozen gross specimens of uniformly thin thickness have not previously been prepared due to the manual, unguided slicing of the specimens from the block.

Accordingly, an object of this invention is the provision of a method, and an apparatus therefor, for the preparation of gross tissue specimens of uniformly thin thickness.

A feature of this invention is the freezing of the lower surface of the block of tissue to a tissue support surface while the remainder of the block remains uniform; and the guiding of a cutting edge through the block at predeterminable intervals of height of the block.

These and other objects and features of this invention will become apparent from the following specification taken in conjunction with the accompanying drawing in which:

FIG. 2 is a side view, in cross-section, taken along the plane 2—2 of FIG. 1;

FIG. 3 is a detail of FIG. 2; and

FIG. 4 is a top plan view of the embodiment of FIG. 1.

Figure 1:
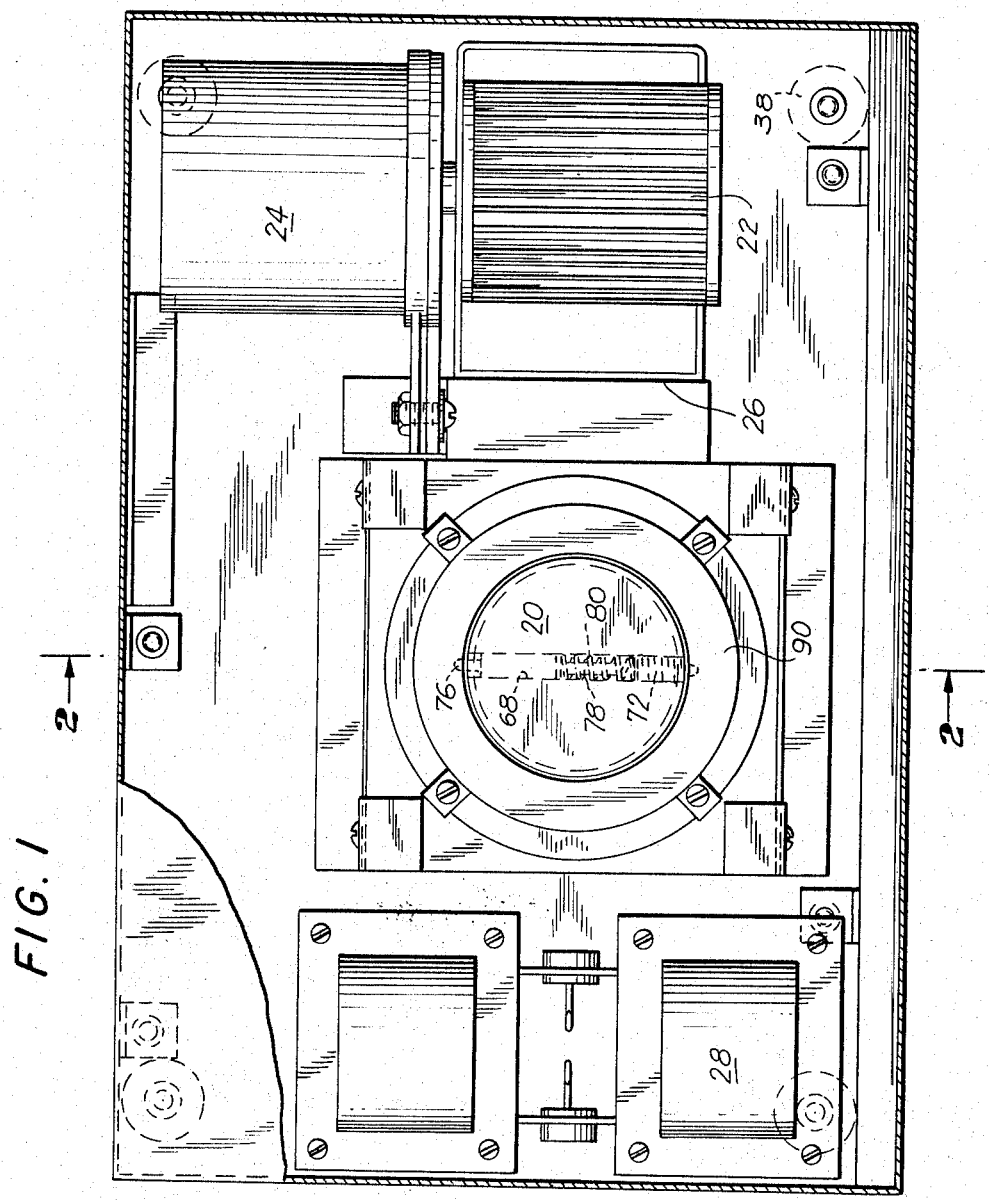
FIG. 1 is a top plan view of an embodiment of this invention shown with the cover in cross-section.

The tissue holder and guide comprises a heat sink 10 having an apertured interior formed by an upper heat sink plate 12, a lower heat sink plate 14 and a plurality of vertical webs 16. A ceramic thermoelectric cooling module 18, such as is manufactured by the Materials Electronic Products Corporation, Trenton, 8, N.J., has an upper and a lower metalized surface. The lower surface of the cooling module 18 is soldered to the upper surface of the upper heat sink plate, and its upper surface is soldered to the lower surface of a heat conductive block 20. The block 20 serves as the tissue support platform. The module 18, the block 20 and the sink 10 are in good thermal contact, and the module 18 is effective to pump heat from the block 20 to the sink 10. A constant voltage transformer 28 supplies power to the cooling module 18. An air blower rotor 22, driven by a motor 24, discharges air through an outlet 26, throuugh the apertured interior of the heat sink 10; and across the transformer 28.

The heat sink 10 has a pair of side plates 30 which mount the sink to two brackets 32, by suitable nuts and bolts 34. The brackets are spot welded to a base plate 36. The base plate has a plurality of feet 38 mounted thereto by respective machine screws 40. A perforated cover 42 has a plurality of angle brackets 44 spot welded thereto and is secured to the base plate by machine screws 46.

The cover 42 has a central aperture 48 through which passes a tubular element 50. The element 50 has a lower, outer annular flange 52 which is also soldered to the upper heat sink plate 12, and an upper, inner flange 54 which has internal threads 56. A rubber gasket 58 is disposed between the flange 52 and the cover 42.

An inner tubular element 60, which serves as the cutting edge guide, has external threads 62 which mesh with the threads 56, and an upper, outer flange 64. A pin 66 is fixed to the element 60, and is adapted to abut the underside of the flange 54 to limit the upward movement of the element. A diametrical bore 68 is formed in the block 20, of which one portion 70 is threaded to receive a set screw 72. A plunger 74 having a round nosed tip 76 and a shaft 78 is also disposed within the bore together with a compression spring 80. Two vertical grooves 82 are provided in the inner wall of the element 60, which together with the round nose 76, provide a click stop detent assembly for the element 60. A groove 84 is formed just below the top of the block 20, and an O-ring 86 is disposed therein to provide a liquid-tight joint between the block 20 and the element 60. The threads 56 and 60 may be chosen to provide any desired axial movement of the cutting edge guide 60 for each rotation thereof, for example, one millimeter, while the click stop 82, 76 provides a convenient indication of such axial movement.

In use, the transformer assembly 28 and the blower motor 24 are energized to cause the thermoelectric cooling module to chill the block 20. A block of tissue 88 is placed on the upper surface of the tissue support block 20, and the lower surface of the tissue block freezes to the upper surface of the support block. The cutting edge guide 60 is rotated to raise its upper surface 90 to the desired height for the first cut through the tissue block. A cutting edge 92, such as a long scapel, is brought across the upper surface 90 of the guide, which surface is perpendicular to the axis of the guide, preferably with a sawing motion to minimize deflection of the tissue block, to cut through the tissue block. The severed upper portion of the tissue block is removed. The guide is rotated to provide the desired downward axial increment, and the tissue block is cut again, to provide a gross tissue specimen of a predetermined, uniform thickness. As many more specimens as are desired are cut from the tissue block. Finally the guide 60 is lowered to its lower limit whereat the upper surface of the support block is level with the upper surface 90 of the guide. The tissue block is scraped off, and the surface is swabbed clean with a solvent such as alcohol.

If desired, the upper surface of the cover 42 may have a cavity 100 to receive a wooden block, and a cavity 102 to receive a block of dental wax. Either of these blocks may be used by the technician, if desired, to support the gross specimen for the lateral trimming thereof.

What is claimed is:

1. A process of providing from a block of tissue a gross tissue specimen of a predetermined uniform thinness, comprising: disposing the not frozen block of tissue on a support surface which is maintained at a freezing temperature whereby the contacting surface of said block of tissue freezes to said support surface while the remainder of said block remains not frozen; supporting a cutting edge in a first plane at a first distance from said tissue support surface, and passing said cutting edge through said block; and supporting said cutting edge in a second plane at a second distance from said tissue support surface which is less than said first distance by a predetermined amount and is parallel to said first plane, and passing said cutting edge through said block.

2. A process according to claim 1 of providing from said block of tissue a plurality of gross tissue specimens each having said predetermined uniform thinness, comprising: supporting said cutting edge in a third plane at a third distance from said tissue support surface which is less than said second distance by said predetermined amount and is parallel to said second plane, and passing said cutting edge through said block.

3. A process according to claim 1 further comprising: separating said contacting surface of said block of tissue from said support surface and cleansing said support surface.

4. Apparatus for providing from a block of tissue a gross tissue specimen of a predetermined uniform thinness, comprising freezing means having a heat conductive surface for supporting said block of tissue; a planar, annular support surface for a cutting edge; elevating means coupled between said heat conductive surface and said cutting edge support surface for disposing said cutting edge support surface at predetermined distances from said heat conductive surface.

5. Apparatus according to claim 4 wherein said freezing means includes an upper heat conductive cylinder having an upper surface adapted to support a block of tissue, a lower heat sink device having means for transferring heat to the atmosphere, and an intermediate heat pumping means mechanically and thermally coupled between said cylinder and said sink.

6. Apparatus according to claim 5 wherein said elevating means includes a first tubular element fixed coaxially about said cylinder, and a second tubular element having said cutting edge support surface, disposed coaxially to said first tubular element and adjustable axially with respect to said first tubular element.

7. Apparatus according to claim 6 wherein said first and second tubular elements having interengaging threads, whereby said cutting edge support surface may be lowered to be coplanar with said tissue support surface and may be raised from said tissue support surface.

References Cited
UNITED STATES PATENTS 2,292,973  8/1942  Richards _____ 83—915.5 X
2,690,699  10/1954  Herbain _____ 83—915.5 X JAMES M. MEISTER, *Primary Examiner.*